US009894278B2

(12) United States Patent
Wei

(10) Patent No.: US 9,894,278 B2
(45) Date of Patent: Feb. 13, 2018

(54) STABILIZER APPLICABLE FOR MOVING SHOOTING

(71) Applicant: Guilin Feiyu Technology Corporation Ltd., Guilin, Guangxi (CN)

(72) Inventor: Chengyun Wei, Guangxi (CN)

(73) Assignee: GUILIN FEIYU TECHNOLOGY CORPORATION LTD., Guilin (CN)

( * ) Notice: Subject to any disclaimer, the term of this patent is extended or adjusted under 35 U.S.C. 154(b) by 98 days.

(21) Appl. No.: 15/176,194

(22) Filed: Jun. 8, 2016

(65) Prior Publication Data

US 2017/0006205 A1 Jan. 5, 2017

(51) Int. Cl.
H04N 5/232 (2006.01)
G02B 27/64 (2006.01)

(52) U.S. Cl.
CPC ......... *H04N 5/2328* (2013.01); *G02B 27/644* (2013.01); *H04N 5/23203* (2013.01)

(58) Field of Classification Search
CPC ............. H04N 5/2328; H04N 5/23203; H04N 5/23248; G02B 27/644; G08B 13/1963
See application file for complete search history.

(56) References Cited

U.S. PATENT DOCUMENTS

| 6,830,337 | B2* | 12/2004 | Angerpointner | F16M 11/10 348/373 |
| 7,209,176 | B2* | 4/2007 | Chapman | F16M 11/10 248/187.1 |
| 9,561,870 | B2* | 2/2017 | Zhou | B64D 47/08 |
| 9,789,976 | B2* | 10/2017 | Zhou | B64D 47/08 |
| 2004/0012674 | A1* | 1/2004 | Wada | G08B 13/19619 348/169 |
| 2005/0185089 | A1* | 8/2005 | Chapman | F16M 11/10 348/375 |
| 2012/0062691 | A1* | 3/2012 | Fowler | F16M 11/10 348/36 |
| 2015/0308618 | A1* | 10/2015 | Valero | F16M 13/04 700/213 |
| 2016/0229556 | A1* | 8/2016 | Zhou | B64D 47/08 |

FOREIGN PATENT DOCUMENTS

CN 204477650 U 7/2015

OTHER PUBLICATIONS

International Search Report of PCT Patent Application No. PCT/CN2015/086041 dated Oct. 19, 2015.

* cited by examiner

Primary Examiner — Nicholas Giles

(57) ABSTRACT

A stabilizer applicable for moving shooting, comprising: an X-axis motor, a Y-axis motor and a Z-axis motor which are orthogonally arranged in space, wherein the X-axis motor controls pitching movement, the Y-axis motor controls rolling movement, and the Z-axis motor controls the movement about yaw axis, wherein a rotating shaft of the Z-axis motor is connected with a stator of the Y-axis motor, and a rotor of the Y-axis motor is connected with a stator of the X-axis motor; and a fixing support arranged on a rotating shaft of the X-axis motor and connected with the rotating shaft of the X-axis motor via a pose estimator, and a Bluetooth module connected with a Z-axis control circuit by serial communication are also provided. The stabilizer is easy to install and may be controlled by a remote or via app, allowing sport fans to shoot during motion.

2 Claims, 2 Drawing Sheets

STABILIZER APPLICABLE FOR MOVING SHOOTING

CROSS-REFERENCE TO RELATED APPLICATIONS

The present application claims the benefit of Chinese Patent Application No. 201510371172.4 filed on Jun. 30, 2015, Chinese Utility Model Application No. 201520457917.4 filed on Jun. 30, 2015, and PCT Application No. PCT/CN2015/086041 filed on Aug. 4, 2015, the contents of which are hereby incorporated by reference.

FIELD OF THE INVENTION

The present invention relates to a stabilizer for shooting equipment, more particular to a stabilizer applicable for moving shooting.

BACKGROUND OF THE INVENTION

The existing stabilizers, which render a smooth motion video, are important accessory for video shooting. The stabilizers include mechanical stabilizers and electronic stabilizers, among which the electronic stabilizer has a small size and is easy to carry. As sport fans have more and more various outdoor sports, their demands for small size and good portability are increasing. For example, some sport fans would like to attach the stabilizers to racing cars, helmets or their wrists, so that the stabilizers will not interfere with their movements. However, the existing stabilizers are hard to install and are not convenient to use.

SUMMARY OF THE INVENTION

The present invention aims to provide a stabilizer applicable for moving shooting, which is easy to install and is convenient to use, allowing sport fans to shoot during moving.

In order to solve this technical problem, the present invention provides a stabilizer applicable for moving shooting, comprising:

- an X-axis motor, a Y-axis motor and a Z-axis motor which are orthogonally arranged in space, wherein the X-axis motor controls pitching movement, the Y-axis motor controls rolling movement, and the Z-axis motor controls the movement about yaw axis, wherein a rotating shaft of the Z-axis motor is connected with a stator of the Y-axis motor, and a rotor of the Y-axis motor is connected with a stator of the X-axis motor;
- a fixing support, which is arranged on a rotating shaft of the X-axis motor and is connected with the rotating shaft of the X-axis motor via a pose estimator;
- a Bluetooth module connected with a Z-axis control circuit by serial communication.

A control circuit is provided. The control circuit comprises an X-axis motor control circuit, a Y-axis motor control circuit and a Z-axis motor control circuit. The X-axis control circuit is electrically connected with the Y-axis control circuit, and the Y-axis control circuit is electrically connected with the Z-axis control circuit. The X-axis control circuit is also connected with a pose estimator circuit, and the Z-axis control circuit is also connected with the Bluetooth module.

A control box is also provided. The Bluetooth module is arranged inside the control box. A stator of the Z-axis motor is arranged on the control box. The battery is installed inside the control box to provide power supply for the whole stabilizer.

The X-axis motor, the Y-axis motor and the Z-axis motor of the stabilizer are respectively arranged with a motor drive circuit and a detection circuit. The detection circuit respectively detects an angle of the motor on three respective axes by means of a magnetic encoder. Based on the pose estimated by the pose estimator and the angle of the motor detected by the magnetic encoder, the target object may be stabilized and the rotating angle may be controlled.

The stabilizer may be controlled by a wired remote or via wireless App (short for Application). The remote is communicated with the Z-axis control circuit via serial connection, and the remote may be capable of controlling X-axis movement and Y-axis movement of the stabilizer. The Bluetooth module inside the control box is communicated with the Z-axis control circuit via serial connection under the control of the wireless App. In this way, via App, the stabilizer may be controlled by the Bluetooth module, the pitch axis and yaw axis of the stabilizer, i.e. X-axis and Z-axis, may be controlled, and also operating modes of the stabilizer may be set and debugged.

The technical solutions of the present invention have advantages as follows: the stabilizer according to the present invention is easy to install and may be controlled by a remote or via app, thereby allowing sport fans to shoot during moving. It has a simple structure with small size and has good portability.

1. X-axis motor; 2. pose estimator; 3. fixing support; 4. Y-axis motor; 5. control box; 6. Z-axis motor; 7. Bluetooth module; 8. connection interface; 9. first mounting hole; 9-1. second mounting hole.

DETAILED DESCRIPTION OF ILLUSTRATED EMBODIMENTS

The present invention is further explained below in conjunction with figures and embodiments. However, the explanations are not intended to limit the scope of the present invention.

Embodiments

Figure 1:
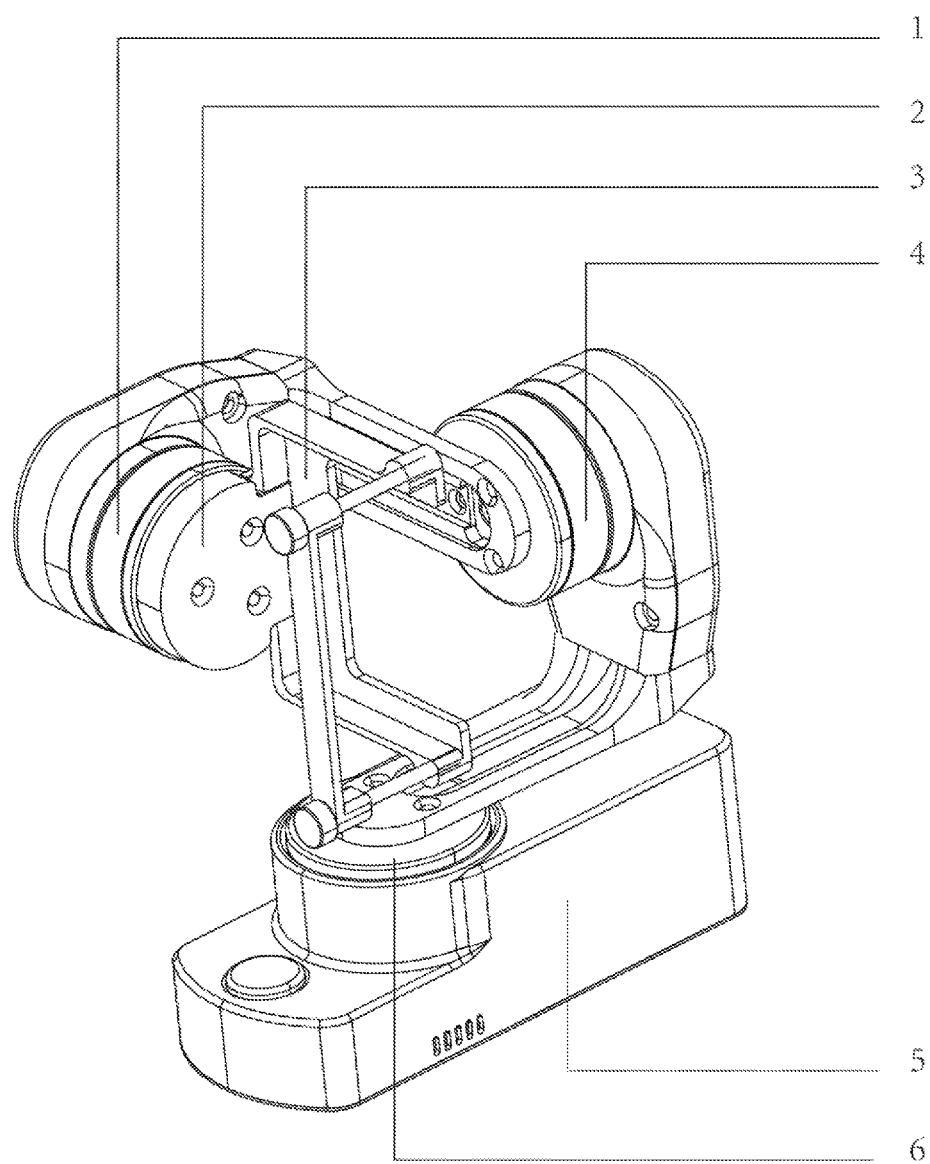
FIG. 1 is a perspective view of an embodiment according to the present invention.
Figure 2:
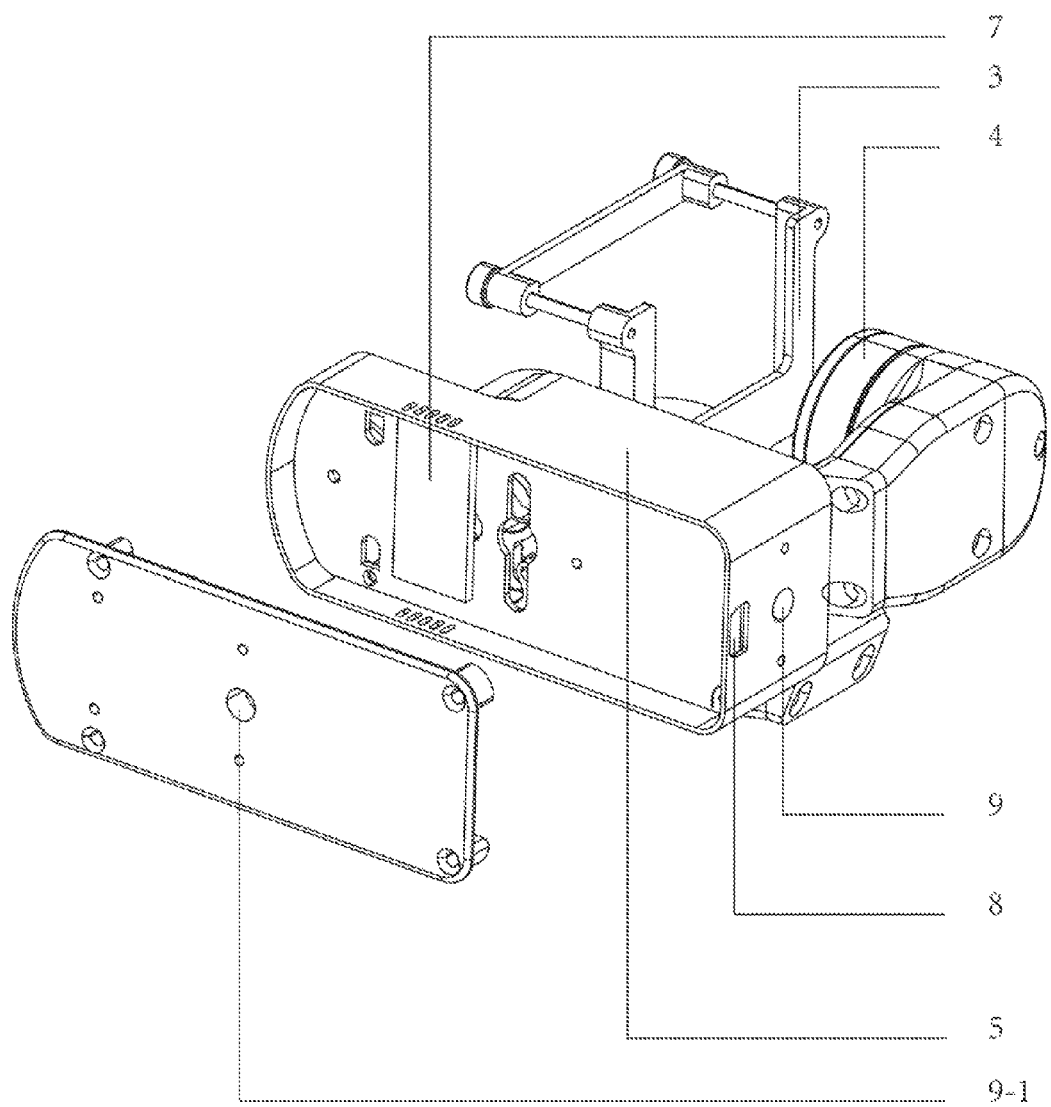
FIG. 2 is a schematic view of an embodiment according to the present invention.

Referring to FIGS. 1 and 2, a stabilizer applicable for moving shooting, comprising:

- an X-axis motor 1, a Y-axis motor 4 and a Z-axis motor 6 which are orthogonally arranged in space, wherein the X-axis motor 1 controls pitching movement, the Y-axis motor 4 controls rolling movement, and the Z-axis motor 6 controls the movement about yaw axis, wherein a rotating shaft of the Z-axis motor 6 is connected with a stator of the Y-axis motor 4, and a rotor of the Y-axis motor 4 is connected with a stator of the X-axis motor 1;
- a fixing support 3, which is arranged on a rotating shaft of the X-axis motor 1 and is connected with the rotating shaft of the X-axis motor 1 via a pose estimator;

wherein the fixing support may install a target object, e.g. a camera, or a mobile phone, etc.;

a Bluetooth module 7 connected with a Z-axis control circuit by serial communication.

A control circuit is provided. The control circuit comprises an X-axis motor control circuit, a Y-axis motor control circuit and a Z-axis motor control circuit. The X-axis control circuit is electrically connected with the Y-axis control circuit, and the Y-axis control circuit is electrically connected with the Z-axis control circuit. The X-axis control circuit is also connected with a pose estimator circuit, and the Z-axis control circuit is also connected with the Bluetooth module 7.

A control box 5 is also provided. The Bluetooth module 7 is arranged inside the control box 5. A stator of the Z-axis motor 6 is arranged on the control box 5. The battery is installed inside the control box 5 to provide power supply for the whole stabilizer.

Particularly, a first mounting hole 9 and a second mounting hole 9-1 are respectively arranged on the back and the bottom of the control box 5 for fixedly attaching the stabilizer to installing devices or wearing devices suitable for the target object. The fixing support 3 is used for fixing the target object.

The Bluetooth module 7 and a lithium battery are arranged inside the control box 5. The stabilizer may communicate by means of the Bluetooth module. The stabilizer, and its pitching movement and yawing movement, may be controlled via a remote or mobile phone App. Also, operating modes of the stabilizer may be set and debugged.

The remote is connected with a serial port of the stabilizer via a connection interface 8. The lithium battery inside of the control box 5 provides power supply for the stabilizer.

The X-axis motor 1, the Y-axis motor 4 and the Z-axis motor 6 of the stabilizer are respectively arranged with a motor drive circuit and a detection circuit. The detection circuit respectively detects an angle of the motor on three respective axes by means of a magnetic encoder. Based on the pose estimated by the pose estimator 2 and the angle of the motor detected by the magnetic encoder, the target object may be stabilized and the rotating angle may be controlled.

The stabilizer according to the present invention may be attached to lots of parts such as cars and wrists by means of installing devices or wearing devices suitable for the target object. The stabilizer may be remotely controlled by a remote or via mobile phone app.

What is claimed is:

1. A stabilizer applicable for moving shooting, comprising:

an X-axis motor, a Y-axis motor and a Z-axis motor which are orthogonally arranged in space, wherein the X-axis motor controls pitching movement, the Y-axis motor controls rolling movement, and the Z-axis motor controls movement about yaw axis, wherein a rotating shaft of the Z-axis motor is connected with a stator of the Y-axis motor, and a rotor of the Y-axis motor is connected with a stator of the X-axis motor;

a fixing support, which is arranged on a rotating shaft of the X-axis motor and is connected with the rotating shaft of the X-axis motor via a pose estimator; and a Bluetooth module connected with a Z-axis control circuit by serial communication.

2. The stabilizer applicable for moving shooting according to claim 1, further comprising a control box, wherein the Bluetooth module is arranged inside the control box, and a stator of the Z-axis motor is arranged on the control box.

* * * * *